US010942785B2

(12) United States Patent
Rao et al.

(10) Patent No.: US 10,942,785 B2
(45) Date of Patent: Mar. 9, 2021

(54) INTEGRATION OF SOFTWARE APPLICATIONS WITH INFRASTRUCTURE

(71) Applicant: salesforce.com, inc., San Francisco, CA (US)

(72) Inventors: Prasad Rao, San Francisco, CA (US); Vasantha Raghavan, San Francisco, CA (US); Srinivasan Ramaswamy, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/536,672

(22) Filed: Aug. 9, 2019

(65) Prior Publication Data
US 2020/0264937 A1    Aug. 20, 2020

Related U.S. Application Data

(60) Provisional application No. 62/807,493, filed on Feb. 19, 2019.

(51) Int. Cl.
*G06F 9/50* (2006.01)
*H04L 12/24* (2006.01)
*G06F 9/54* (2006.01)
*H04L 29/06* (2006.01)

(52) U.S. Cl.
CPC ............ *G06F 9/5072* (2013.01); *G06F 9/542* (2013.01); *H04L 41/0813* (2013.01); *H04L 41/0863* (2013.01); *H04L 41/0866* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 8,219,967 | B2* | 7/2012 | Zhang | G06Q 10/06 717/102 |
| 2005/0289532 | A1* | 12/2005 | Zakon | G06F 9/54 717/165 |
| 2007/0022404 | A1* | 1/2007 | Zhang | G06Q 10/06 717/103 |

\* cited by examiner

*Primary Examiner* — Esther B. Henderson
(74) *Attorney, Agent, or Firm* — Holland & Hart LLP

(57) ABSTRACT

Methods, systems, and devices for network integration are described. Some systems may implement an integration platform including a service composition layer (SCL), a network abstraction layer (NAL), and one or more application programming interfaces (APIs). The integration platform may support application and network flexibility, customization, and modular design based on the SCL and NAL. For example, the SCL may receive an execution request (e.g., an intent) corresponding to a service and may parse the execution request to determine a set of modular tasks. The SCL may send a modular task (e.g., via an API) to the NAL for processing. The NAL may determine a type of infrastructure architecture (e.g., including querying for network node connections, parameters, etc.) associated with the integration platform and may modify the modular task based on the information. The NAL may execute the modular task on one or more network devices to perform the service.

20 Claims, 9 Drawing Sheets

INTEGRATION OF SOFTWARE APPLICATIONS WITH INFRASTRUCTURE

CROSS REFERENCES

The present Application for patent claims priority to U.S. Provisional Patent Application No. 62/807,493 by Rao et al., entitled "INTEGRATION OF SOFTWARE APPLICATIONS WITH INFRASTRUCTURE," filed Feb. 19, 2019, which is assigned to the assignee hereof and expressly incorporated by reference herein.

FIELD OF TECHNOLOGY

The present disclosure relates generally to database systems and data processing, and more specifically to integration of software applications with infrastructure.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems (e.g., cloud-based systems or other types of systems), underlying infrastructure may support communications between user devices. For example, network devices (e.g., servers, routers, switches, etc.) may support connections between different computing devices. However, the connections between these network devices may be brittle (i.e., changes in the system may easily break connections between devices). For example, each connection between network devices may be a unique connection within the system. Introducing a new network device into the system or updating a network device in the system may cause existing connections to fail. Additionally or alternatively, modifications to applications running on the system may also cause connections to fail. These failed connections between network devices within the infrastructure may result in connectivity issues, increased latency in the system, or both.

DETAILED DESCRIPTION

Figure 1:
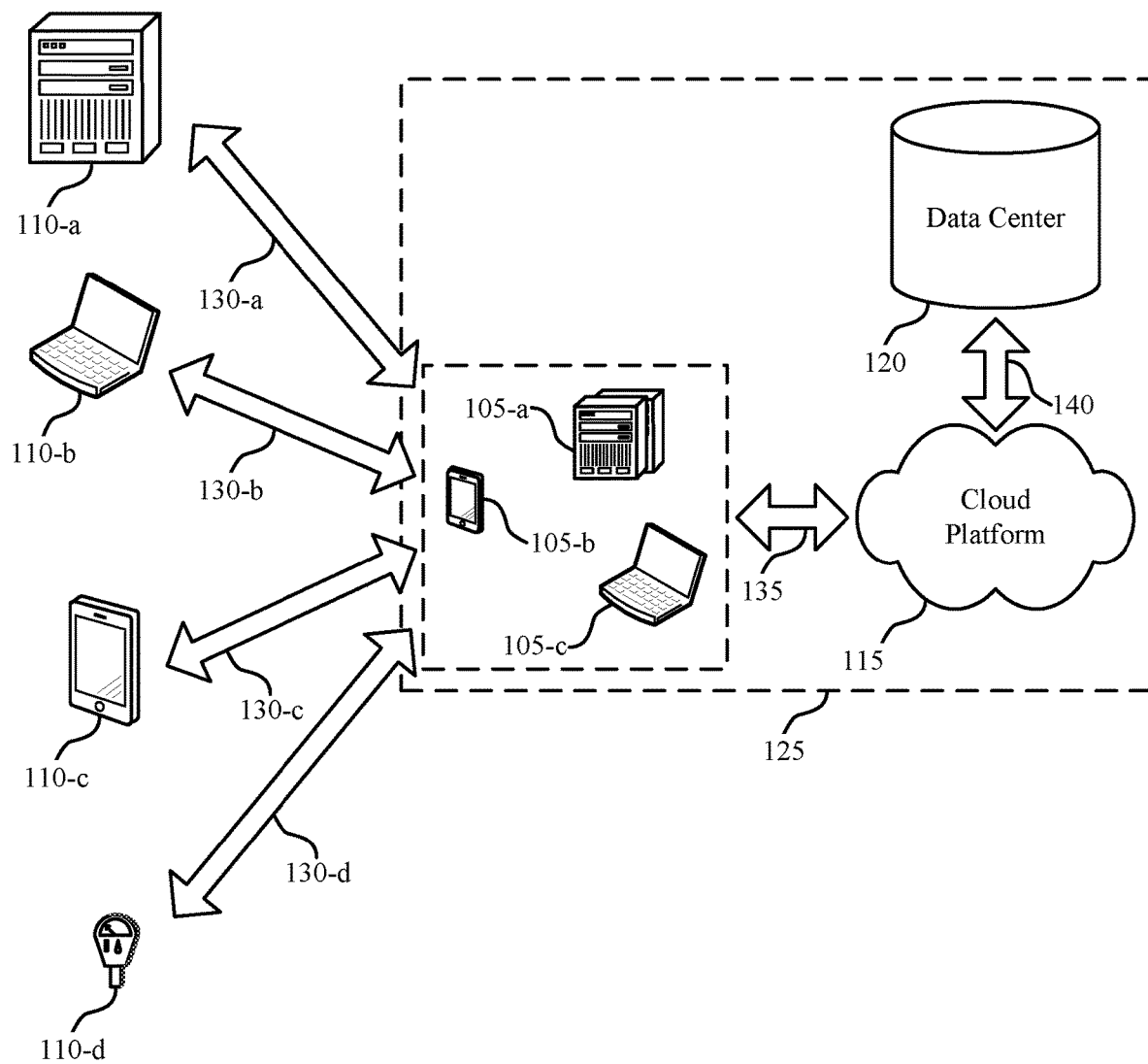
FIG. 1 illustrates an example of a system for cloud computing that supports integration of software applications with infrastructure in accordance with aspects of the present disclosure.

Applications and infrastructure may often change due to increased demands for data connections, security, and/or new or improved functionality for applications or network nodes. Within some systems, changes to applications or infrastructure may cause breaks in connectivity between existing network devices. For example, introducing new or updated network devices may break existing connections between network devices within the system. Furthermore, new or updated applications specifying network operations may result in inefficient changes to configurations within the system. To support efficient and flexible modifications to applications and architecture within a system, the system may implement an integration solution to provide orchestration, automation, and integration for network infrastructure.

An integration platform may provide the integration solution. This integration platform may include a service composition layer (SCL), a network abstraction layer (NAL), an experience layer (EXL), one or more application programming interfaces (APIs), or some combination of these components. The different layers may provide separation of application-related information from network-related information, while the combination of the layers supports tracking application or user-based information corresponding to network operations. In this way, the integration platform may support changes to the applications at the SCL without affecting the underlying network devices and may support changes to the network devices at the NAL without affecting the applications running on the network. The integration platform may additionally support customization and modular designs for improved applicability and efficient modification of network operations and configurations. Some example network operations include provisioning Layer 2 (L2) virtual private networks (VPNs), provisioning Layer 3 (L3) VPNs, modifying communication protocols, or some combination of these or other services.

To integrate multiple software applications with multiple infrastructure architectures, the SCL of the integration platform may receive, from a user device (e.g., via a user interface supporting network operation design), an execution request corresponding to a service of the integration platform. This execution request may indicate an intent for the integration platform to perform some service, such as one or more network operations. The SCL may parse the execution request to determine a set of modular tasks and may send a modular task to the NAL (e.g., via an API). In some cases, the SCL may modify one or more of the tasks based on user information received from the user device. The NAL may receive the modular task and may determine network connections between network devices in the system. In some cases, the NAL may determine a type of infrastructure architecture associated with the integration platform and may modify the modular task based on the type of infrastructure architecture. The NAL may execute the modular task on one or more network devices of the infrastructure architecture.

Aspects of the disclosure are initially described in the context of an environment supporting an on-demand database service. Additional aspects of the disclosure are described with respect to architectures, use cases, and process flows. Aspects of the disclosure are further illustrated by and described with reference to apparatus diagrams, system diagrams, and flowcharts that relate to integration of software applications with infrastructure.

FIG. 1 illustrates an example of a system 100 for cloud computing that supports integration of software applications with infrastructure in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120. In some cases, the system 100 or subsystem 125 may support integration of software applications with infrastructure as described herein.

Figure 2:
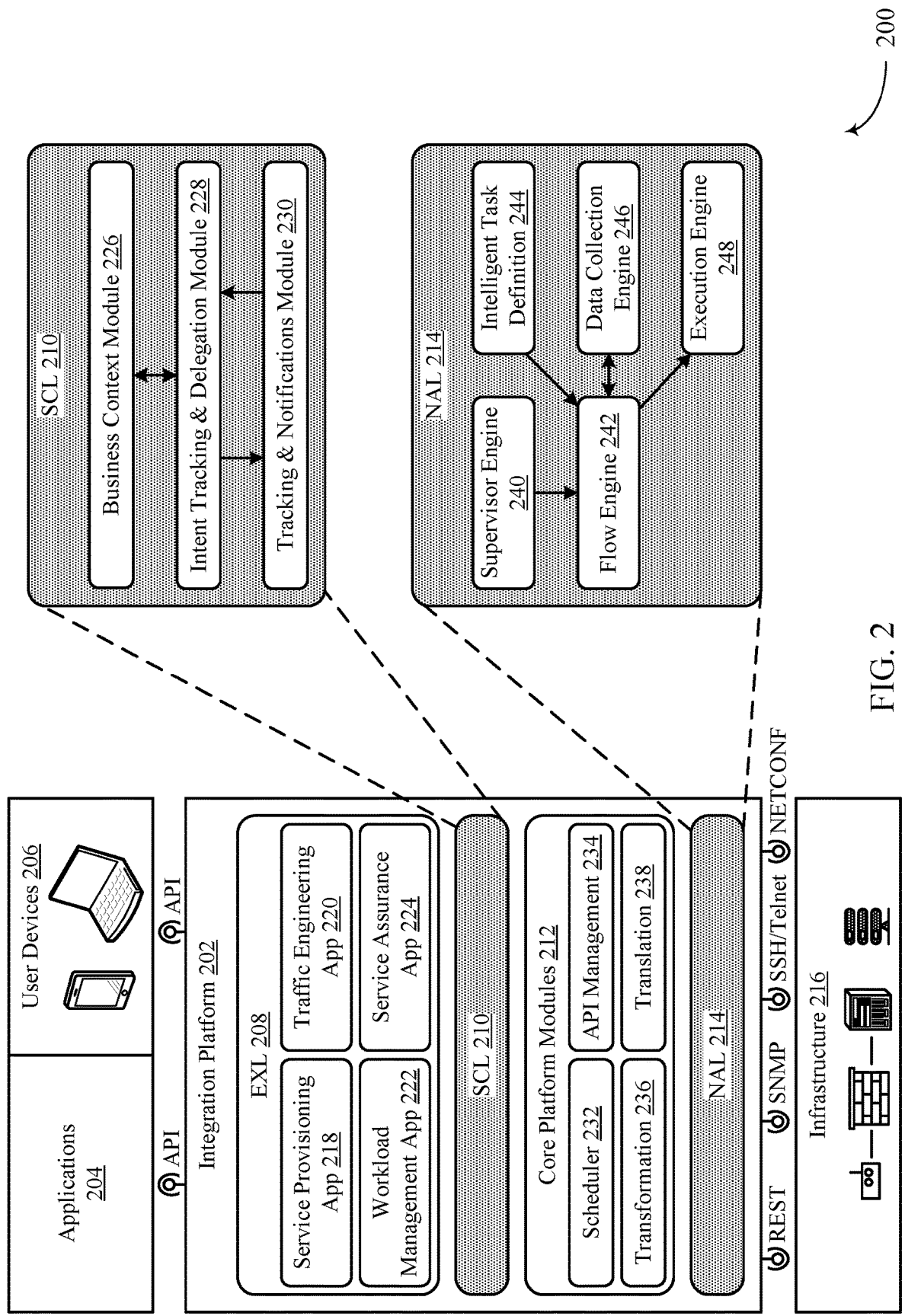
FIG. 2 illustrates an example of a logical architecture for an integration platform that supports integration of software applications with infrastructure in accordance with aspects of the present disclosure.

FIG. 2 illustrates an example of a logical architecture 200 for an integration platform 202 that supports integration of software applications with infrastructure in accordance with aspects of the present disclosure. The integration platform 202 may run on a server (e.g., a physical server, a virtual machine, a container, etc.) or a server cluster. In some cases, the integration platform 202 may be a component of a system 125 as described with reference to FIG. 1. The integration platform 202 may provide an integration solution for network architecture. The integration platform 202 may include multiple layers, such as an EXL 208, an SCL 210, one or more core platform modules 212, an NAL 214, or some combination of these or other layers. The integration platform 202 may communicate data between layers using one or more APIs or layer connectors. Due to the combination of layers, the integration platform 202 may perform orchestration, automation, and integration for a network infrastructure within a single platform.

In some cases, the integration platform 202 may support customization, modular design, or both for improved applicability and efficient modification. For example, the integration platform 202 may support network device setup and/or provisioning that is customizable by a network architect. Additionally or alternatively, the integration platform 202 may support a modular design for tasks performed on the network devices within the infrastructure 216. For example, a user interacting with the integration platform (e.g., via an application 204 or a user device 206, which may be an example of a cloud client 105 as described with reference to FIG. 1) may transmit an execution request to the integration platform 202. In some cases, the execution request may specify a request, where the request includes a number of specific tasks or steps for the integration platform 202 to perform in a specific order. In other cases, the execution request may specify an intent, where the intent indicates a more generic goal for the integration platform 202 to accomplish. In these cases, the integration platform 202 may determine, based on the intent, a set of specific tasks or steps to perform in order to accomplish the intent. Additionally or alternatively, the integration platform 202 may support pre-configured network services (e.g., setting up an L2 VPN, setting up an L3 VPN, etc.). In these cases, the user may modify device-specific information for a pre-configured network service and the integration platform 202 may store a sequence of tasks for performing the pre-configured network service based on the device-specific information.

If the user sends the execution request, the integration platform 202 may receive the execution request via an EXL 208. The EXL 208 may connect the integration platform to a number of applications 204 (e.g., software applications, web applications, etc.) running on a number of user devices 206. The EXL 208 may interact with the applications 204 based on one or more APIs configured for the EXL 208. In some cases, the EXL 208 may handle interactions with service provisioning applications 218, traffic engineering applications 220, workload management applications 222, service assurance applications 224, network services applications, or any combination of these or similar applications. A user device 206 may run an application 204 for managing execution requests to the integration platform 202, where the user inputs a request or an intent into the user interface (UI), and the EXL 208 receives or retrieves the execution request via an API.

The integration platform 202 may implement a number of layers to process the execution request. The different layers may isolate different processes, supporting interactions with both user devices 206 and the underlying infrastructure 216. For example, the SCL 210 may handle an intent received from a user. The SCL 210 may parse the intent and decipher the indicated goal of the intent. The SCL 210 may build up, from an elemental level, a sequence of tasks or a transaction to perform at the infrastructure level based on the processed intent. For example, the SCL 210 may identify a set of modular tasks to perform in order to accomplish the goal of the intent, and the SCL 210 may determine an order for these tasks to be performed based on the interpretation of the intent. In some cases, each task may be grouped into a category or type of task, such as a filter task, a validate task, a configuration task, etc. The integration platform 202 may support a number of common tasks or intents. Templates of these common tasks or intents may be exposed to the user via an API. Additionally, the modular tasks determined for the received intent may be exposed to the user via the API, such that the user may view the tasks determined based on the input intent. Because the tasks are modular, the user may update the set of tasks (e.g., change the sequence of tasks, remove or replace a task, add a task, modify a task, etc.) in the UI. As such, the modular tasks may support a more flexible network integration solution than platforms using hardcoded requests (i.e., where modifications occur at the request-level, rather than the task-level).

The integration platform 202 may perform life cycle management for requests or intents based on the determined modular tasks. For example, to update a request or intent, the integration platform 202 may not modify an entire configuration for the request or intent. Instead, the integration platform 202 (e.g., using the SCL 210) may identify the specific task or component to update and may modify this task without affecting the rest of the configuration. To support this efficient life cycle management, the SCL 210 may store the data associated with requests or intents at the integration platform 202. These configurations may be stored for a number of different network operation categories. The integration platform 202 may also store the tasks built by the SCL 210. For example, the SCL 210 may build the tasks at a micro-level and may surface the tasks to a user for modification (e.g., combining tasks, removing tasks, adding new tasks, re-ordering tasks, etc.). The task-related information may be exposed to a user in a software application for task development at a user device 206. The SCL 210 may store any updates made by the user to the generated tasks. In some cases, the SCL 210 or EXL 208 may test modified sequences of tasks to verify whether a modified sequence is supported by the network or integration platform 202. The integration platform 202 may throw an error for any process flow of tasks that is not supported.

With the parsing, the SCL 210 may support decoupling the execution requests from an application or business context (e.g., using a business context module 226). For example, when the integration platform 202 receives an execution request, the execution request may correspond to a specific user, tenant, organization, or some combination of these. However, the network infrastructure 216 may not be able to handle or track this type of information. As such, the business context module 226 may decipher and store the business-related information while preparing the relevant network automation and orchestration information to send to the NAL 214 for processing. In this way, the SCL 210 may store information correlating a user or organization with a specific set of modular tasks for an intent, even if the modular tasks themselves do not contain this information (e.g., in order to support processing at the NAL 214). The intent tracking and delegation module 228 may determine the set of modular tasks corresponding to the intent and may determine when/how to run these tasks. The tracking and notifications module 230 may track (e.g., store in memory) information corresponding to the intents and the modular tasks. These logs may support viewing by a user. Additionally or alternatively, the tracking and notifications module 230 may transmit flags or notifications to a user corresponding to that user's activity. For example, if a user or organization surpasses a usage threshold for that user or organization, the tracking and notifications module 230 may identify this system overuse and may transmit a notification to the user or organization indicating the system overuse.

The SCL 210 may send one or more tasks to the NAL 214 for execution. The SCL 210 and NAL 214 may communicate through an API. In some cases, the SCL 210, the NAL 214, or an API between the SCL 210 and NAL 214 may use one or more core platform modules 212 to assist in processing requests, intents, tasks, or transactions (e.g., sets of tasks to perform a specified number of times). The core platform modules 212 may include a scheduler 232 (e.g., for scheduling the communication of tasks from the SCL 210 to the NAL 214), an API management module 234 (e.g., for managing the API procedures), a transformation module 236

(e.g., for transforming tasks and/or other information between the SCL 210 and NAL 214), a translation module 238 (e.g., for translating tasks and/or other information between the SCL 210 and NAL 214), or any combination of these or other core platform modules 212.

The NAL 214 may perform abstraction for the infrastructure. The NAL 214 may abstract the specific processes and/or requirements associated with a specific network device such that the NAL 214 may run modular tasks on many different types of network devices. In some cases, the abstraction at the NAL 214 may allow support for new types of network devices introduced into the system, for new infrastructure architecture types, or both. For example, any device (e.g., a device that emits digital signals and can receive transmissions from the integration platform) may be added into the infrastructure 216 and handled by the NAL 214. To add support for a new network device, the NAL 214 may receive and read a configuration file for the new network device. The NAL 214 may parse the configuration file into modular components and may determine information about the new network device based on these components (e.g., rather than based on the configuration file as a whole). The NAL 214 may determine what services are running on the network device based on parsing the configuration file and may store this information in memory. Once the information for a new network device is added, the NAL 214 may modify or provision the new network device as part of the infrastructure 216.

The NAL 214 may store network-related information for the network devices of the infrastructure 216. Each network device (e.g., each virtual server, physical server, router, connection, etc.) may be managed as a node or endpoint. The nodes may be grouped (e.g., based on type, classification, etc.) and may have one or more properties and connections. The NAL 214 may store the node information for efficient querying at the NAL 214. For example, the NAL 214 may store the network node information, including the relationships between the devices, in a table in memory.

The NAL 214 may receive, via an API, the modular tasks determined at the SCL 210. The NAL 214 may interact with the infrastructure 216 (e.g., via a representational state transfer (REST) API, a simple network management protocol (SNMP) port, a secure shell (SSH)/telecommunications and networks (Telnet) port, a network configuration protocol (NETCONF) port, or any combination of these or other similar protocols, ports, or interfaces) based on the received modular tasks. For example, the NAL 214 may provision resources of the infrastructure 216, establish or use connections between network devices in the infrastructure 216, or perform any number of other processes on the infrastructure 216 based on a modular task. In some cases, the NAL 214 may handle all network-related processing performed by the integration platform 202, including, but not limited to, interacting with the network, abstracting and exposing information corresponding to the infrastructure 216, and composing the information for processing. The SCL 210 may govern the interactions between the NAL 214 and the network (e.g., where the SCL 210 handles the application-related intents without information about the underlying infrastructure 216), while the NAL 214 may determine how to interact with the network devices, process data from or to the network devices, and otherwise handle the infrastructure 216 and network devices without information about the application-related intents.

The NAL 214 may execute a single task or a set of tasks (e.g., a set of modular tasks corresponding to an intent). In some cases, the NAL 214 may include a supervisor engine 240, a flow engine 242, an intelligent task definition engine 244, a data collection engine 246, an execution engine 248, or some combination of these or other similar engines. The set of engines may work together to perform the network processes. For example, the flow engine 242 may receive instructions and task-related information from the supervisor engine 240 and the intelligent task definition engine 244. In some cases, the flow engine 242 may store information about a task to execute in the data collection engine 246. Additionally or alternatively, the flow engine 242 may retrieve information from the data collection engine 245 associated with a task to execute. The flow engine 242 may execute one or more services on the infrastructure 216 using the execution engine 248.

The combination of the SCL 210 and NAL 214 may support infrastructure 216 modifications based on user or organization-related information. For example, based on the combination of layers, the integration platform 202 may associate a business transaction across multiple network intents. In one specific example, the integration platform 202 may receive a purchase order (e.g., from an application 204, a user device 206, etc.) that calls for performing a set of services or procedures (e.g., five services). This purchase order may be directed to the SCL 210, where the SCL 210 may determine a number of intents based on the purchase order. For example, the SCL 210 may determine a set of three network intents, where one intent covers three of the services and the other two intents each cover one service. The SCL 210 may identify a sequence for these intents and, based on the integration between the SCL 210 and the NAL 214, the SCL 210 may call the corresponding network operations at the NAL 214 in a particular sequence (e.g., as part of a transaction). The NAL 214 may execute the indicated network operations on the network devices in the infrastructure 216 according to the relationships between the network devices stored or identified at the NAL 214.

Additionally or alternatively, the combination of the SCL 210 and the NAL 214 may support rollback for a specific user, group of users, or organization. For example, because the integration platform 202 processes and tracks information corresponding to both users and the network, the integration platform 202 may identify network processes related to a specific user or organization and may update those network processes in a rollback procedure. For example, the integration platform 202 may receive instructions to rollback a specific service. This service may be one line item of a purchase order, where the purchase order includes a number of other services. However, due to the parsing and modularization at the SCL 210, the SCL 210 may identify the transaction corresponding to the service to rollback and may indicate to the NAL 214 the proper network process to undo based on the rollback command.

Each transaction, order, and/or network operation may have its own life cycle. For example, the integration platform 202 may receive an execution request (e.g., a purchase order) to provision five virtual machines (VMs) owned or associated with a first provider for a user. In this example, the SCL 210 may decouple the user information from the network operation (e.g., VM provisioning), and the NAL 214 may abstract the network information to identify which network devices correspond to the first provider. The SCL 210 may send five modular tasks to the NAL 214 to perform five VM provisioning operations (e.g., at servers for the first provider). At some time after provisioning the five VMs for the user, the integration platform 202 may receive a command to switch two of the VMs over to a second provider. As the SCL 210 may identify the tasks performed for the first user, the SCL 210 may send further tasks to the NAL 214 to cancel two VMs provisioned from the first provider and provision two VMs with the second provider. When performing this rollback procedure, the NAL 214 may automatically release the rolled-back resources into a resource pool. For example, the NAL 214 may automatically release the resources corresponding to the two VMs previously provisioned from the first provider back into an available resource pool. This may support a more efficient usage of network resources by the integration platform 202, as resources may not remain tied up after rollback procedures.

In another example, a user (e.g., via a user device 206) may send an execution request to the integration platform 202 to connect a first operating point (e.g., a home network or user device 206) to a second point (e.g., the internet from a certain internet provider). The execution request may indicate a first data rate (e.g., one gigabit (Gb)) for the connection. At a later time, the integration platform 202 may receive a second execution request from the user to modify the connection (e.g., drop the data rate to a second data rate, such as a ten megabit (Mb) data rate, or cancel the internet service). The SCL 210 may identify the task performed previously to set up the connection based on an identifier of the user and may send one or more tasks to the NAL 214 to change the connection from the one Gb connection to a different connection. This rollback operation may also automatically release the removed resources. For example, if the NAL 214 switches the network from a one Gb connection to a ten Mb connection for the user, the NAL 214 may change the configuration of a router in the infrastructure 216 to indicate the additional data resources available following the change to the connection.

Based on the modularity of tasks and configurations, the integration platform 202 may rollback subsets of services for users. For example, if the integration platform 202 stacks ten services for a user, the integration platform 202 may rollback one of the services (e.g., at the task or elemental level) and release the corresponding resources back to an available resource pool without affecting the other nine services. The network may then use these resources for other operations or users. Accordingly, the supported rollback features of the integration platform 202 may improve the modularity and efficiency of using the network resources.

The integration platform 202 may additionally or alternatively support efficient querying and mapping of network information. For example, the integration platform 202 may receive an execution request to establish a connection between two users running user devices 206 in different geographic areas. The NAL 214 may identify connection possibilities between the user devices 206 based on the information (e.g., node types, node properties, node connections, etc.) stored about the network nodes. For example, the NAL 214 may identify a first endpoint router for the first user device 206 in the first geographic region and may identify a second endpoint router for the second user device 206 in the second geographic region. The NAL 214 may search for path connections between the endpoint routers. Searching for possible paths may involve determining the protocols supported by different nodes in the system (e.g., if one node supports a border gateway protocol (BGP) while another node does not, these two nodes may not be able to connect) and identifying connection paths between the endpoint routers using a common protocol. The NAL 214 may additionally determine how to connect the user devices 206 (e.g., customer edge routers) to the endpoint routers. Based on the analysis of the network nodes and the execution request (e.g., modularized by the SCL 210), the NAL 214 may identify a "best" path (e.g., most efficient, most reliable, fastest, etc.) for connecting the user devices 206 using the infrastructure 216. Based on the NAL 214 abstracting and storing the network information using nodes and relationships between nodes, the NAL 214 may query for the node information and may map the information to the possible connection paths in low latency, efficient operations for a large number of nodes (e.g., tens of thousands of nodes in the infrastructure 216).

The integration platform 202 may implement thresholds for network services for one or more users. In some cases, a user, set of users, or organization may obtain a threshold amount of network resources (e.g., based on a license obtained by that user, set of users, or organization). In an allocation-based system, a user may be assigned a pre-defined quota for certain network services. For example, a user may be allocated five VMs in the network. Once the integration platform 202 provisions the user with five VMs, the integration platform 202 may stop processing further execution requests from the user for provisioning additional VMs. In some cases, the SCL 210 may track the thresholds (e.g., based on received requests and/or intents and the corresponding modular tasks determined by the SCL 210). The EXL 208 may send an indication to a user if a received request is not processed based on a resource limit for the user. In a usage-based system, a user may be assigned a certain usage load on one or more network devices. As long as the network operations performed for the user remain at or below the load threshold (e.g., 80%), the integration platform 202 may continue processing requests for the user. If the user requests a network operation that may cause the load on the network or network devices to exceed the user-specific load threshold, the integration platform 202 may refrain from performing the network operation based on the usage-based limit.

The SCL 210 may store logs related to network operations performed for a user, group of users, or organization. For example, the SCL 210 may store time sequence information corresponding to business-related information (e.g., as opposed to network device-related information). For example, the SCL 210 may store a number of requests and/or intents submitted by a user, how many of these requests and/or intents were or were not processed by the network, timestamps for performing tasks or achieving intents, or any combination of this or other information. In some cases, a user may specify what data to log in the system for that user or a corresponding organization. The log information may be stored in an internal or external database. In some cases, the integration platform 210 may pre-process the raw data prior to pushing the data to an external database for storage. The pre-processing may modify the data to be more user-friendly (e.g., the data may be organized for better understanding or analysis by a user).

Figure 3:
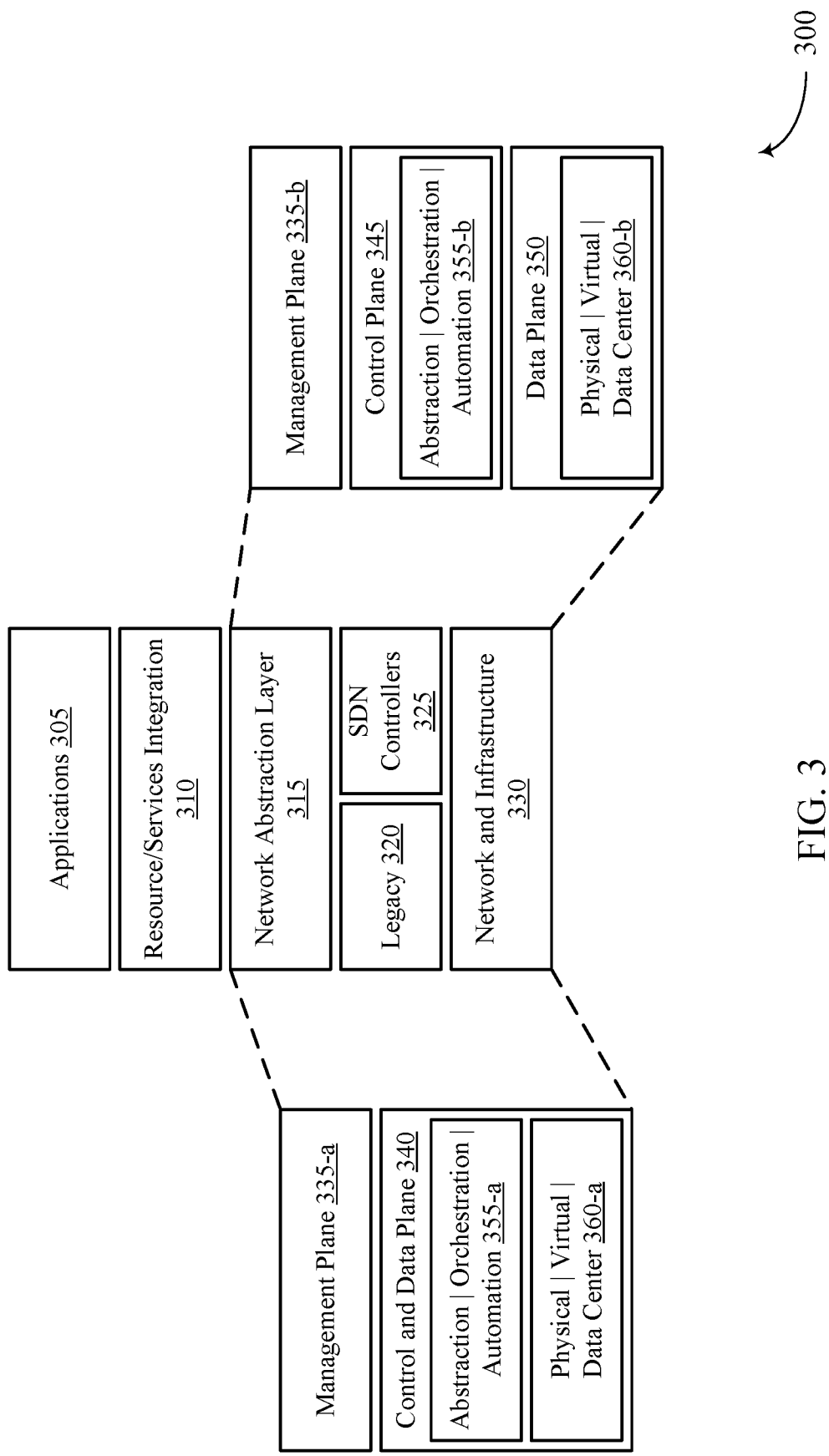
FIG. 3 illustrates an example of a five-layer conceptual architecture that supports integration of software applications with infrastructure in accordance with aspects of the present disclosure.

FIG. 3 illustrates an example of a five-layer conceptual architecture 300 that supports integration of software applications with infrastructure in accordance with aspects of the present disclosure. The five-layer conceptual architecture 300 may include an applications layer 305, a resource/services integration layer 310, a network abstraction layer 315, a legacy layer 320 or software-defined networking (SDN) controllers layer 325, and a network and infrastructure layer 330. The five-layer conceptual architecture 300 may be a conceptual representation of the logical architecture 200 described with reference to FIG. 2. For example, the resource/services integration layer 310 and network abstraction layer 315 may correspond to the integration platform 202, the applications layer 305 may correspond to the applications 204, and the network and infrastructure layer 330 may correspond to the infrastructure 216 as described with reference to FIG. 2. The five-layer conceptual architecture 300 may support services using integration between applications (e.g., including new business models, partner ecosystems, etc.) and infrastructure.

As shown in the five-layer conceptual architecture 300, an integration platform may support both "legacy" and "modern" networks. "Legacy" networks may correspond to networks without abstraction support while "modern" networks may correspond to networks with controllers (e.g., SDN controllers) providing abstraction support. Furthermore, "legacy" networks may have combined data and control planes 340 while "modern" networks may have data plane 350 and control plane 345 separation. The integration platform may be configured to handle how legacy stacks are built and how modern stacks are built. For example, to handle a legacy network, the integration platform may include a management plane 335-$a$ and a control and data plane 340, where the control and data plane 340 may include abstraction, orchestration, and automation functions 355-$a$ and physical, virtual, and data center network management 360-$a$. To handle a modern network, the integration platform may include a management plane 335-$b$, a control plane 345 including abstraction, orchestration, and automation functions 355-$b$, and a data plane 350 including physical, virtual, and data center network management 360-$b$.

For legacy systems, the integration platform may read configuration files for the network devices and interpret the information for abstraction. Based on the configuration files, the integration platform may determine state information for each network device and may identify connection information for the devices based on the state information. For modern systems, the integration platform may handle multiple different controllers abstracting the network information. For example, the integration platform may communicate with different controllers and may aggregate and/or normalize information received from different controllers. The integration platform may also handle interactions between legacy and modern networks and may be able to convert information from modern to legacy network information or legacy to modern network information. For example, the integration platform may support a migration process from a first infrastructure architecture (e.g., a legacy network) to a second infrastructure architecture (e.g., a modern network). Additionally or alternatively, the integration platform may support new devices or controllers added into a network (e.g., based on new or updated configuration files, abstractions, etc.).

Figure 4:
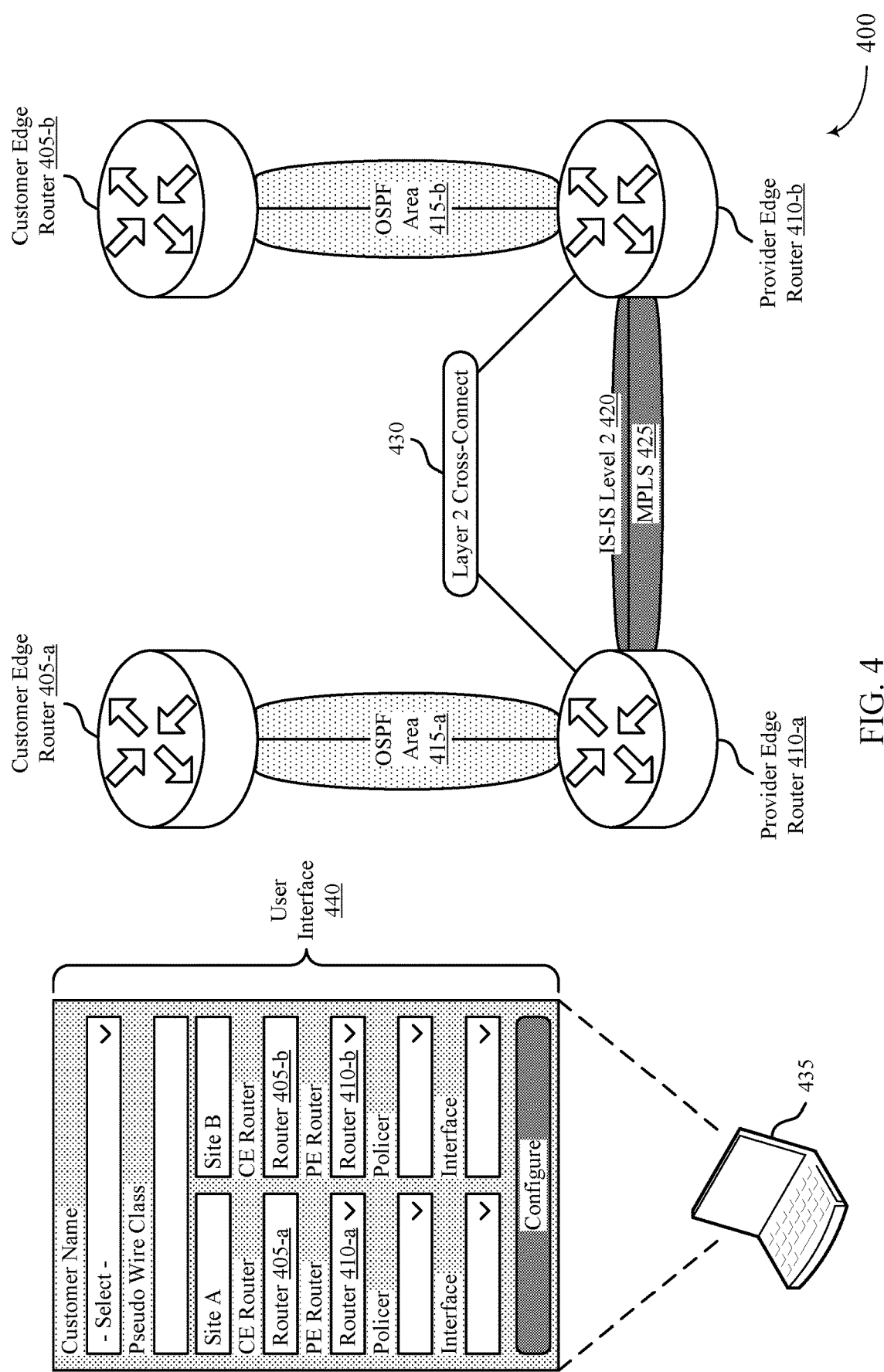
FIG. 4 illustrates an example of a layer 2 (L2) virtual private network (VPN) connection procedure that supports integration of software applications with infrastructure in accordance with aspects of the present disclosure.

FIG. 4 illustrates an example of an L2 VPN connection procedure 400 that supports integration of software applications with infrastructure in accordance with aspects of the present disclosure. The L2 VPN connection procedure 400 may be an example of a use case for an integration platform, such as an integration platform 202 described with reference to FIG. 2. The L2 VPN connection procedure 400 may illustrate connecting a first customer edge router 405-$a$ to a second customer edge router 405-$b$ using a secure L2 VPN. The L2 VPN may use multiprotocol label switching (MPLS) labels to transport data between provider edge routers 410-$a$ and 410-$b$. In some cases, the provider may include one or more additional routers (e.g., network nodes) in a connection path between the provider edge routers 410-$a$ and 410-$b$. A user may initiate the L2 VPN setup using an application driven user interface 440 (e.g., on a user device 435).

The application running on the user device 435 may provide an integration solution for network operations. In some cases, the integration solution may support service provisioning (e.g., including automating provisioning for L2 VPNs or L3 VPNs, automating auditing and compliance of network devices, automating software upgrade processes and checks, etc.), network connectivity, network services, service assurance, or any combination of these services. A user operating the user device 435 may input information into the user interface 440 that may be used to setup the L2 VPN. In some cases, this input information may be referred to as user information associated with the user device 435.

Setting up the L2 VPN may involve the integration platform establishing connections between a number of network devices. For example, the integration platform my receive an indication of the customer edge router 405-$a$ and the customer edge router 405-$b$ (e.g., in the user information associated with the user device 435). In some cases, the integration platform may additionally receive an indication of the provider edge router 410-$a$ and the provider edge router 410-$b$. An SCL of the integration platform may determine the modular tasks needed to setup the L2 VPN and may store user-specific information corresponding to these tasks. An NAL of the integration platform may receive the modular tasks and may perform the network operations on the network devices. For example, the integration platform (e.g., the NAL) may determine a connection path from the customer edge router 405-$a$ to the customer edge router 405-$b$. The integration platform may determine the path based on path lengths, data rates, available resources, or any combination of these or other path parameters.

The integration platform may determine a first provider edge router 410-$a$ for the customer edge router 405-$a$ based on an open shortest path first (OSPF) area 415-$a$. The integration platform may additionally determine a second provider edge router 410-$b$ for the customer edge router 405-$b$ based on an OSPF area 415-$b$. These provider edge routers 410-$a$ and 410-$b$ may be positioned on the edge of the provider's network (e.g., next to the customer's network). In some cases, the customer edge routers and provider edge routers may be determined based on information provided by the user (e.g., a network service provider). Any intermediate network nodes between the provider edge router 410-$a$ and the provider edge router 410-$b$ may be determined by the NAL. These provider edge routers may be connected via an L2 cross-connect 430, and may transport traffic using MPLS 425 in intermediate system to intermediate system (IS-IS) level 2 420 connections. The MPLS 425 may support information passing between the nodes based on virtual links or paths, rather than endpoints. If a user selects to configure the L2 VPN, the system may establish a pseudo wire tunnel between the provider edge routers 410-$a$ and 410-$b$, thereby connecting the customer edge routers 405-$a$ and 405-$b$ at different geographic locations.

In some cases, the L2 VPN integration solution may be a default process supported by the integration platform. For example, the integration platform may store a sequence of tasks corresponding to setting up an L2 VPN. This sequence of tasks may include sequential steps, branches in logic (e.g., based on successful or unsuccessful connections), strategies for catching exceptions, or any combination of these. These tasks may include or be based on code snippets (e.g., code snippets for automating router functionality).

Based on the L2 VPN solution being divided into modular tasks, a user may modify the sequence of tasks for the L2 VPN solution (e.g., without affecting the other tasks making up the L2 VPN solution). For example, in a user interface displaying the process flow of tasks for the L2 VPN, a user could drag and drop task icons to modify the L2 VPN setup procedure (e.g., removing a task, editing a task, adding a task, etc.). The integration platform or the application may verify that a sequence created by a user is supported by the platform. If the sequence is supported, the integration platform may perform the corresponding network operations based on the custom sequence of tasks (e.g., when a user selects the "Configure" button in the user interface 440). If the sequence is not supported, the integration platform may send a sequencing error message to the user interface. This user interface displaying the customizable process flow of tasks for a network operation may be referred to as an intent designer user interface.

In some cases, the integration platform (e.g., including the intent designer user interface) may support a number of other services. For example, the integration platform may support provisioning an L3 VPN, which may support peering. Additionally or alternatively, the integration platform may support a BGP, which is a routing protocol for transferring data and information between different host gateways, the Internet, autonomous systems, or some combination of these. BGP may be an example of a path vector protocol (PVP) and may maintain paths to different hosts, networks, and/or gateway routers and may determine routing decisions based on the paths. Because it is a PVP, BGP may communicate the autonomous system/network path topology corresponding to the BGP to other networks and may maintain a routing table with topologies of externally connected networks. BGP may be used as the routing protocol between internet service providers, where the BGP may be referred to as an external BGP (EBGP). Additionally or alternatively, BGP may be used as the core routing protocol within large internet service provider networks, where the BGP may be referred to as an internal BGP (IBGP). Similarly, a BGP used to facilitate communication between different autonomous systems may be referred to as an EBGP and a BGP used at host networks or autonomous systems may be referred to as an IBGP. In some cases, a BGP routing protocol may be established between provider edge routers 410-*a* and 410-*b* after establishing an L2 or L3 communication channel.

Figure 5:
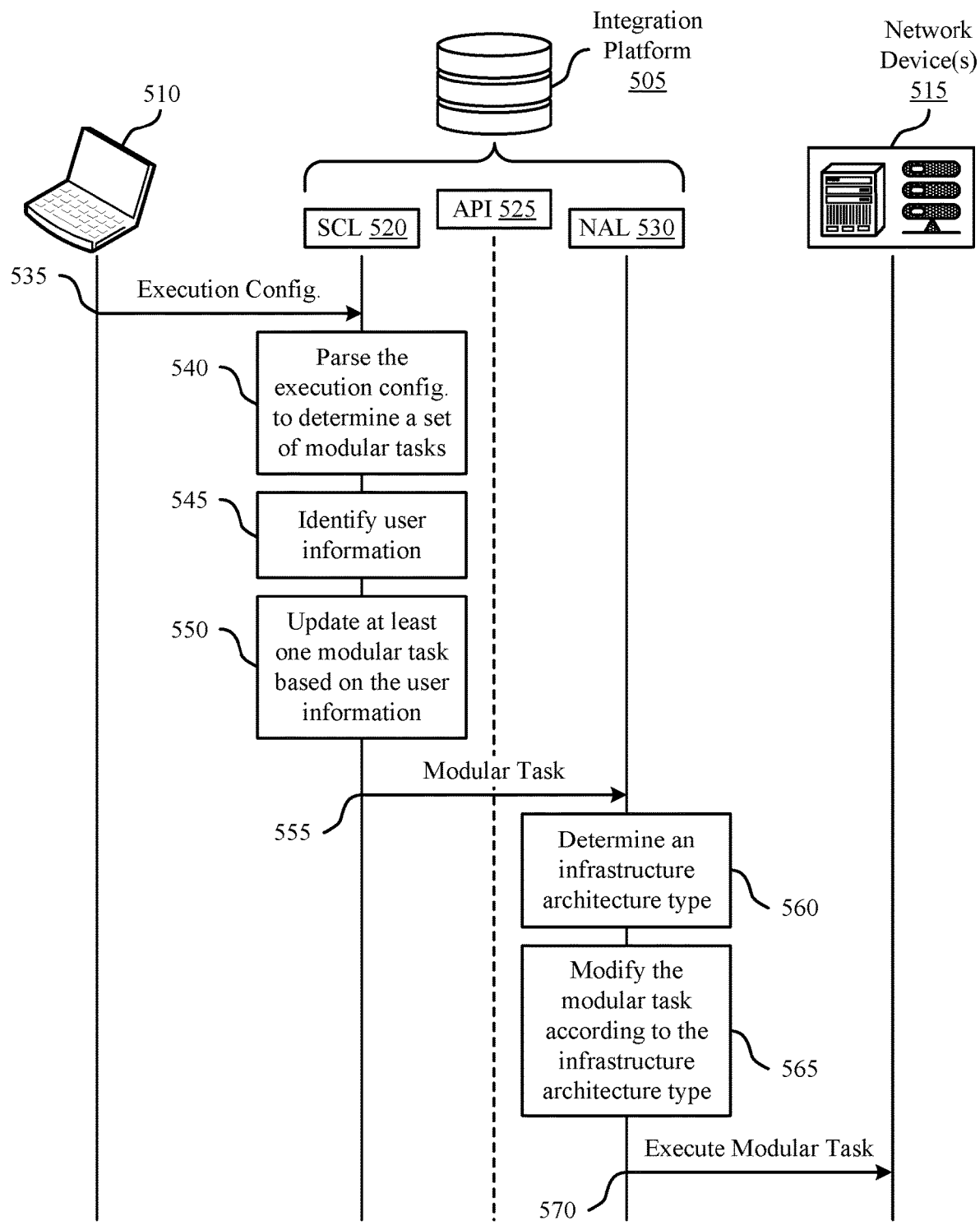
FIG. 5 illustrates an example of a process flow that supports integration of software applications with infrastructure in accordance with aspects of the present disclosure.

FIG. 5 illustrates an example of a process flow 500 that supports integration of software applications with infrastructure in accordance with aspects of the present disclosure. The process flow 500 may involve an integration platform 505, a user device 505, and a set of network devices 515. The integration platform 505 may be an example of an integration platform 202, the user device 510 may be an example of a cloud client 105, a user device 206, or a user device 435, and the set of network devices 515 may be examples of infrastructure 216 as described herein with reference to FIGS. 1 through 4. The integration platform 505 may provide an integration solution for underlying infrastructure (e.g., the network devices 515). The integration platform 505 may include a number of layers operating together to support integration, automation, and orchestration. For example, the integration platform 505 may include an SCL 520, an API 525, and an NAL 530. Alternative examples of the following may be implemented, where some steps are performed in a different order than described or are not performed at all. In some cases, steps may include additional features not mentioned below, or further steps may be added.

At 535, the user device 510 may transmit an execution request corresponding to a service of the integration platform 505. In some cases, the execution request may be an example of an intent. At 540, the integration platform 505 (e.g., at the SCL 520) may parse the execution request to determine a set of modular tasks corresponding to the execution request. In some cases, the SCL 520 may additionally determine a sequence or process flow for these tasks. At 545, the SCL 520 may identify user information. For example, the SCL 520 may identify user information associated with the user device 510. This user information may be one or more parameters input into a user interface at the user device 510 specifying variables for a network operation. In some cases, the user information may associate the execution request with a specific user or organization. The SCL 520 may update at least one modular task of the set of modular tasks based on the identified user information.

At 555, the SCL 520 may send a modular task to the NAL 530. The API 525 may communicate the information between the SCL 520 and the NAL 530. In some cases, the SCL 520 may send the set of modular tasks (e.g., according to a scheduler and the determined sequence) to the NAL 530.

The NAL 530 may receive, from the SCL 520, a modular task of the set of modular tasks. At 560, the NAL 530 may determine a type of infrastructure architecture associated with the integration platform. For example, the infrastructure architecture may be a "legacy" architecture, a "modern" architecture, or may be associated with a specific provider, controller, or some combination of these. At 565, the NAL 530 may modify the modular task according to the determined type of infrastructure architecture. At 570, the integration platform 505 (e.g., at the NAL 530) may execute the modified modular task on one or more network devices 515 of the infrastructure architecture. These network devices 515 may include servers, switches, access points, routers, modems, hubs, bridges, repeaters, racks, or any combination of these or other network devices 515.

Figure 6:
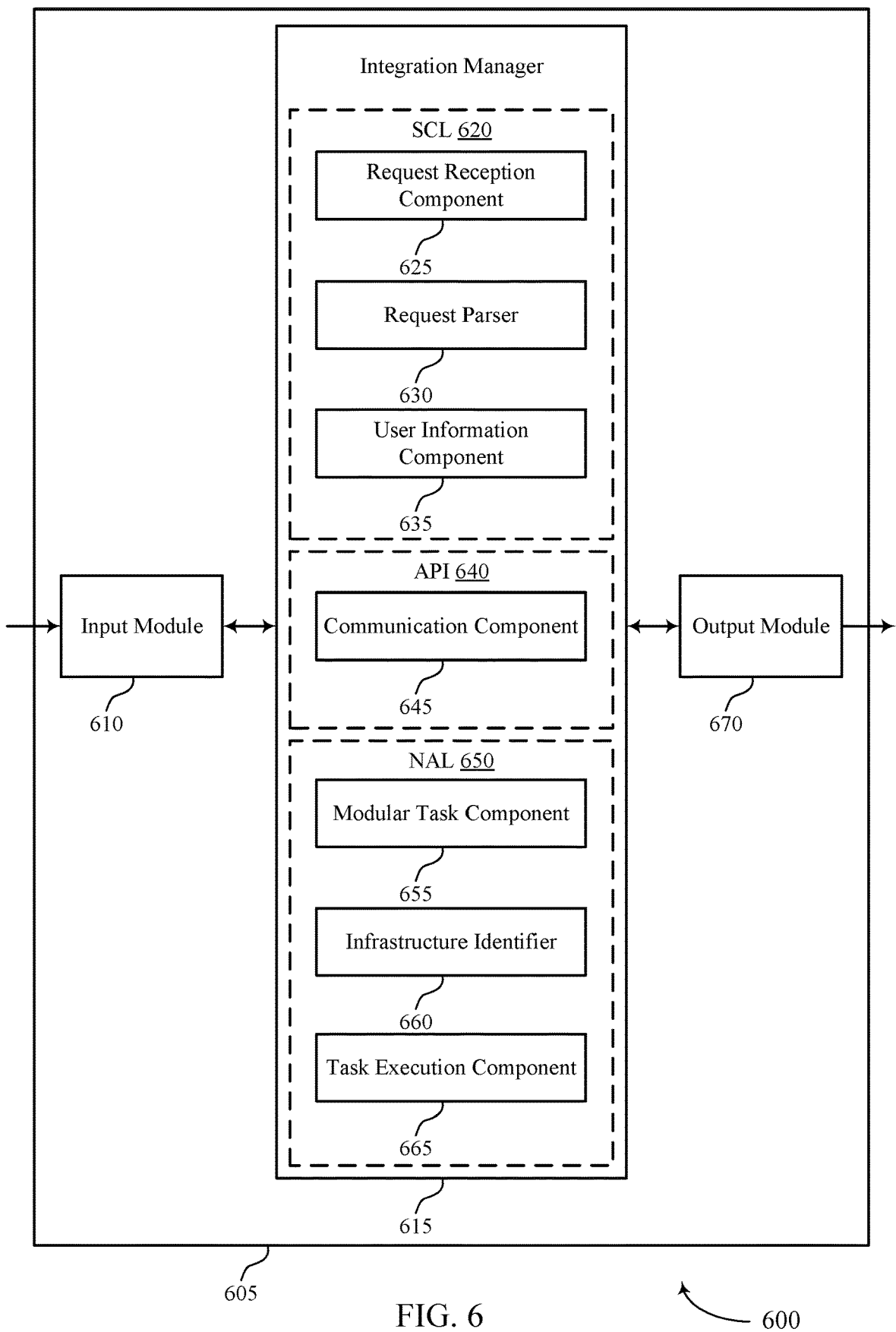
FIG. 6 shows a block diagram of an apparatus that supports integration of software applications with infrastructure in accordance with aspects of the present disclosure.

FIG. 6 shows a block diagram 600 of an apparatus 605 that supports integration of software applications with infrastructure in accordance with aspects of the present disclosure. The apparatus 605 may include an input module 610, an integration manager 615, and an output module 670. The apparatus 605 may also include a processor. Each of these components may be in communication with one another (e.g., via one or more buses). In some cases, the apparatus 605 may be an example of a user terminal, a database or application server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the integration manager 615 to support integration of software applications with infrastructure. In some cases, the input module 610 may be a component of an input/output (I/O) controller 815 as described with reference to FIG. 8.

The integration manager 615 may include an SCL 620, an API 640, and an NAL 650. The SCL 620 may include a request reception component 625, a request parser 630, and a user information component 635, the API 640 may include a communication component 645, and the NAL 650 may include a modular task component 655, an infrastructure identifier 660, and a task execution component 665. The integration manager 615 may be an example of aspects of the integration manager 705 or 810 described with reference to FIGS. 7 and 8.

The integration manager 615 and/or at least some of its various sub-components may be implemented in hardware, software executed by a processor, firmware, or any combination thereof. If implemented in software executed by a processor, the functions of the integration manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The integration manager 615 and/or at least some of its various sub-components may be physically located at various positions, including being distributed such that portions of functions are implemented at different physical locations by one or more physical devices. In some examples, the integration manager 615 and/or at least some of its various sub-components may be a separate and distinct component in accordance with various aspects of the present disclosure. In other examples, the integration manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The SCL 620 may be configured with a request reception component 625, a request parser 630, and a user information component 635. The request reception component 625 may receive, from a user device, an execution request corresponding to a service of the integration platform. The request parser 630 may parse the execution request to determine a set of modular tasks corresponding to the execution request. The user information component 635 may identify user information associated with the user device and may update at least one modular task of the set of modular tasks based on the identified user information.

The API 640 may be configured with a communication component 645. The communication component 645 may communicate information between the SCL 620 and the NAL 650.

The NAL 650 may be configured with a modular task component 655, an infrastructure identifier 660, and a task execution component 665. The modular task component 655 may receive, from the SCL 620, a modular task of the set of modular tasks. The infrastructure identifier 660 may determine a type of an infrastructure architecture associated with the integration platform and may modify the modular task of the set of modular tasks according to the determined type of the infrastructure architecture. The task execution component 665 may execute the modified modular task on one or more network devices of the infrastructure architecture.

The output module 670 may manage output signals for the apparatus 605. For example, the output module 670 may receive signals from other components of the apparatus 605, such as the integration manager 615, and may transmit these signals to other components or devices. In some specific examples, the output module 670 may transmit output signals for display in a user interface, for storage in a database or data store, for further processing at a server or server cluster, or for any other processes at any number of devices or systems. In some cases, the output module 670 may be a component of an I/O controller 815 as described with reference to FIG. 8.

Figure 7:
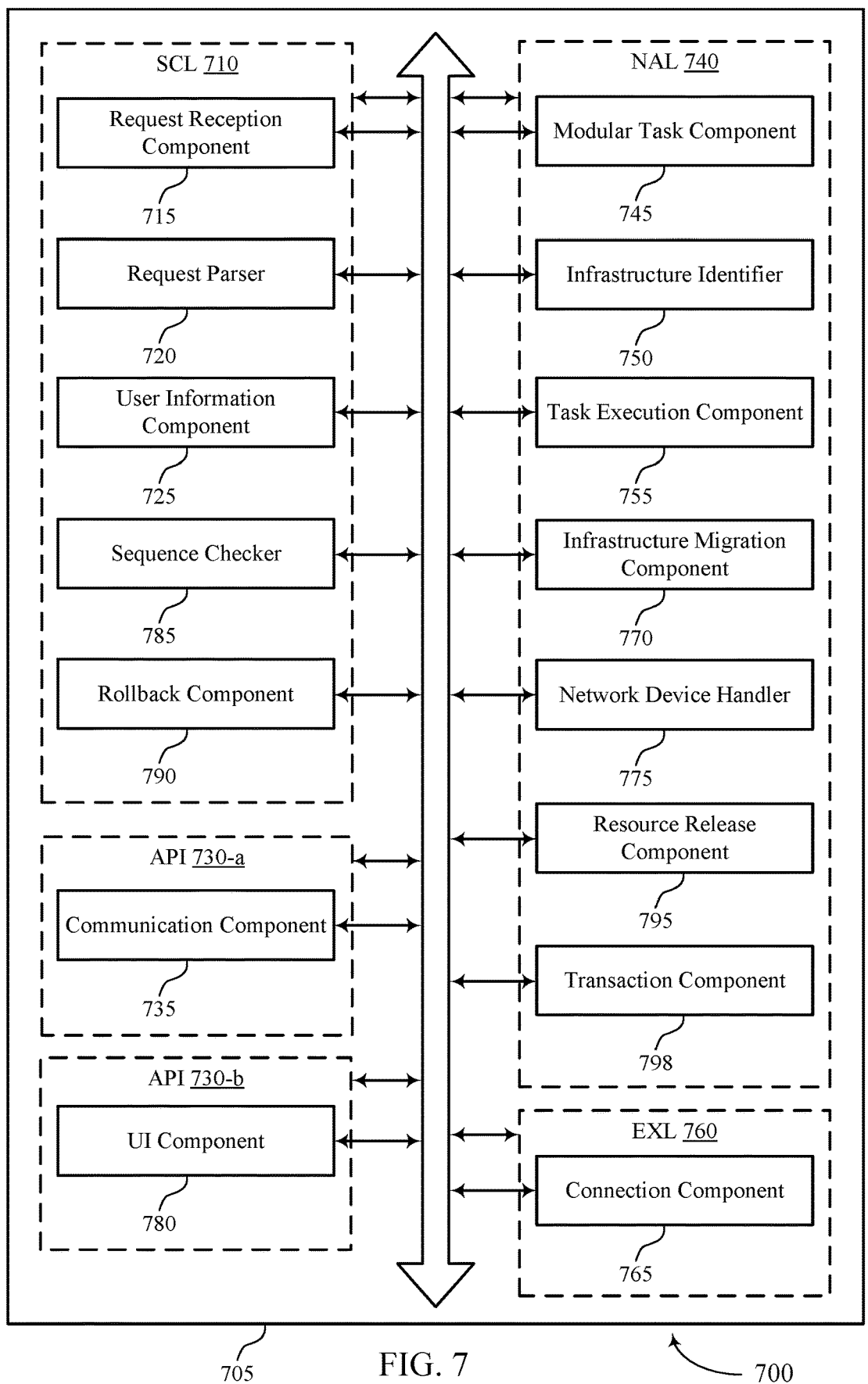
FIG. 7 shows a block diagram of an integration manager that supports integration of software applications with infrastructure in accordance with aspects of the present disclosure.

FIG. 7 shows a block diagram 700 of an integration manager 705 that supports integration of software applications with infrastructure in accordance with aspects of the present disclosure. The integration manager 705 may be an example of aspects of an integration manager 615 or an integration manager 810 described herein. The integration manager 705 may be a component of an integration platform. In some cases, the integration manager 705 may include an SCL 710, an API 730-a, an NAL 740, an additional API 730-b, an EXL 760, or some combination of these components or layers. The SCL 710 may include a request reception component 715, a request parser 720, a user information component 725, a sequence checker 785, a rollback component 790, or some combination thereof. The API 730-a may include a communication component 735. The NAL 740 may include a modular task component 745, an infrastructure identifier 750, a task execution component 755, an infrastructure migration component 770, a network device handler 775, a resource release component 795, a transaction component 798, or some combination thereof. The additional API 730-b may include a UI component 780 and the EXL 760 may include a connection component 765. Each of these modules may communicate, directly or indirectly, with one another (e.g., via one or more buses).

The SCL 710 may be configured to perform one or more of the functions described with respect to the request reception component 715, the request parser 720, the user information component 725, the sequence checker 785, the rollback component 790, or some combination thereof.

The request reception component 715 may receive, from a user device, an execution request corresponding to a service of the integration platform. The request parser 720 may parse the execution request to determine a set of modular tasks corresponding to the execution request. In some cases, the set of modular tasks includes filtering tasks, validation tasks, configuration tasks, or a combination thereof. The user information component 725 may identify user information associated with the user device and may update at least one modular task of the set of modular tasks based on the identified user information.

The API 730-a may be configured to perform one or more of the functions described with respect to the communication component 735. The communication component 735 may communicate information between the SCL 710 and the NAL 740.

The additional API 730-b may be configured to perform one or more of the functions described with respect to the UI component 780. The UI component 780 may transmit, to the user device, an indication of a user interface supporting construction of execution requests by a user, where the execution request is received based on a user input to the user interface. In some examples, the UI component 780 may receive an additional execution request based on an additional user input to the user interface. In some examples, the request parser 720 may parse the additional execution request to determine an additional set of modular tasks corresponding to the additional execution request. The sequence checker 785 may identify whether an execution sequence corresponding to the additional set of modular tasks is supported by the integration platform. In some examples, if the execution sequence corresponding to the additional set of modular tasks is not supported by the integration platform, the sequence checker 785 may transmit, to the user device, a sequencing error message based on the identifying whether the execution sequence corresponding to the additional set of modular tasks is supported by the integration platform.

The NAL 740 may be configured to perform one or more of the functions described with respect to the modular task component 745, the infrastructure identifier 750, the task execution component 755, the infrastructure migration component 770, the network device handler 775, the resource release component 795, the transaction component 798, or some combination thereof.

The modular task component 745 may receive, from the SCL, a modular task of the set of modular tasks. The infrastructure identifier 750 may determine a type of an infrastructure architecture associated with the integration platform and may modify the modular task of the set of modular tasks according to the determined type of the infrastructure architecture. The task execution component 755 may execute the modified modular task on one or more network devices of the infrastructure architecture.

In some examples, the one or more network devices of the infrastructure architecture may include a set of routers. In some cases, the task execution component 755 may establish an L2 VPN, an L3 VPN, or a combination thereof between the set of routers based on the executing. In other cases, the task execution component 755 may establish a BGP routing protocol between the set of routers based on the executing. In some cases, the BGP routing protocol is an EBGP routing protocol, an IBGP routing protocol, or a combination thereof. In some cases, the one or more network devices include servers, switches, access points, routers, modems, hubs, bridges, repeaters, racks, or a combination thereof.

In some cases, the infrastructure architecture may be an example of a first infrastructure architecture and the type of the infrastructure architecture may be an example of a first type of infrastructure architecture. In these cases, the infrastructure migration component 770 may identify a migration process from the first infrastructure architecture to a second infrastructure architecture of a second type of infrastructure architecture. The infrastructure migration component 770 may receive, from the first infrastructure architecture, one or more configurations for the one or more network devices of the first infrastructure architecture, may normalize the one or more configurations for the one or more network devices of the first infrastructure architecture, and may configure one or more network devices of the second infrastructure architecture based on the normalization.

In some examples, the infrastructure migration component 770 may determine the second type of infrastructure architecture based on the migration process, may further modify the modular task of the set of modular tasks according to the determined second type of infrastructure architecture, and may execute the further modified modular task on the one or more network devices of the second infrastructure architecture.

The network device handler 775 may identify a new network device of the infrastructure architecture and may configure the new network device of the infrastructure architecture based on the set of modular tasks. In some examples, the network device handler 775 may store, in a table in memory, indications of relationships between the one or more network devices of the infrastructure architecture and may query the table in memory for one or more relationships of the relationships between the one or more network devices of the infrastructure architecture, where executing the modified modular task on the one or more network devices of the infrastructure architecture is based on results of the querying.

In some cases, the rollback component 790 may receive a rollback command for a software application of the set of software applications, a network device of the one or more network devices of the infrastructure architecture, the execution request, or a combination thereof. The rollback component 790 may release service resources corresponding to the software application of the set of software applications, the network device of the one or more network devices of the infrastructure architecture, the execution request, or the combination thereof based on the rollback command. The resource release component 795 may release network resources corresponding to the software application of the set of software applications, the network device of the one or more network devices of the infrastructure architecture, the execution request, or the combination thereof based on the rollback command.

The transaction component 798 may receive, from the SCL, a transaction including the set of modular tasks and an execution parameter and may execute the set of modular tasks a number of times according to the execution parameter based on receiving the transaction.

The EXL 760 may be configured to perform one or more of the functions described with respect to the connection component 765. The connection component 765 may connect the integration platform to the set of software applications running on a set of user devices. In some cases, the connection component 765 includes a service provisioning application, a network services application, a traffic engineering application, a workload management application, a service assurance application, or a combination thereof for managing connections with the set of software applications.

Figure 8:
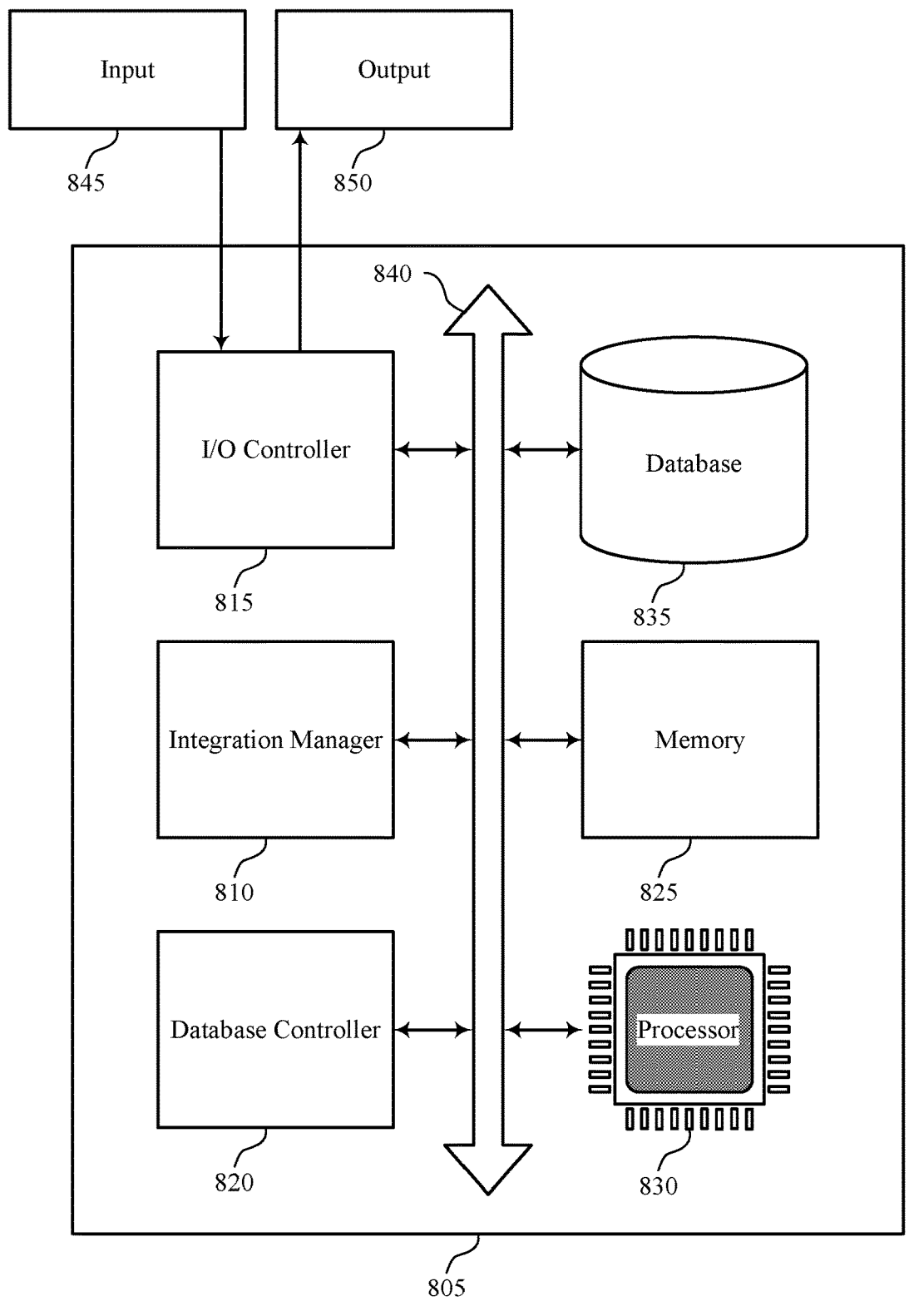
FIG. 8 shows a diagram of a system including a device that supports integration of software applications with infrastructure in accordance with aspects of the present disclosure.

FIG. 8 shows a diagram of a system 800 including a device 805 that supports integration of software applications with infrastructure in accordance with aspects of the present disclosure. The device 805 may be an example of or include the components of an integration platform or an apparatus 605 as described herein. The device 805 may include components for bi-directional data communications including components for transmitting and receiving communications, including an integration manager 810, an I/O controller 815, a database controller 820, memory 825, a processor 830, and a database 835. These components may be in electronic communication via one or more buses (e.g., bus 840).

The integration manager 810 may be an example of an integration manager 615 or 705 as described herein. For example, the integration manager 810 may perform any of the methods or processes described above with reference to FIGS. 6 and 7. In some cases, the integration manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting integration of software applications with infrastructure).

Figure 9:
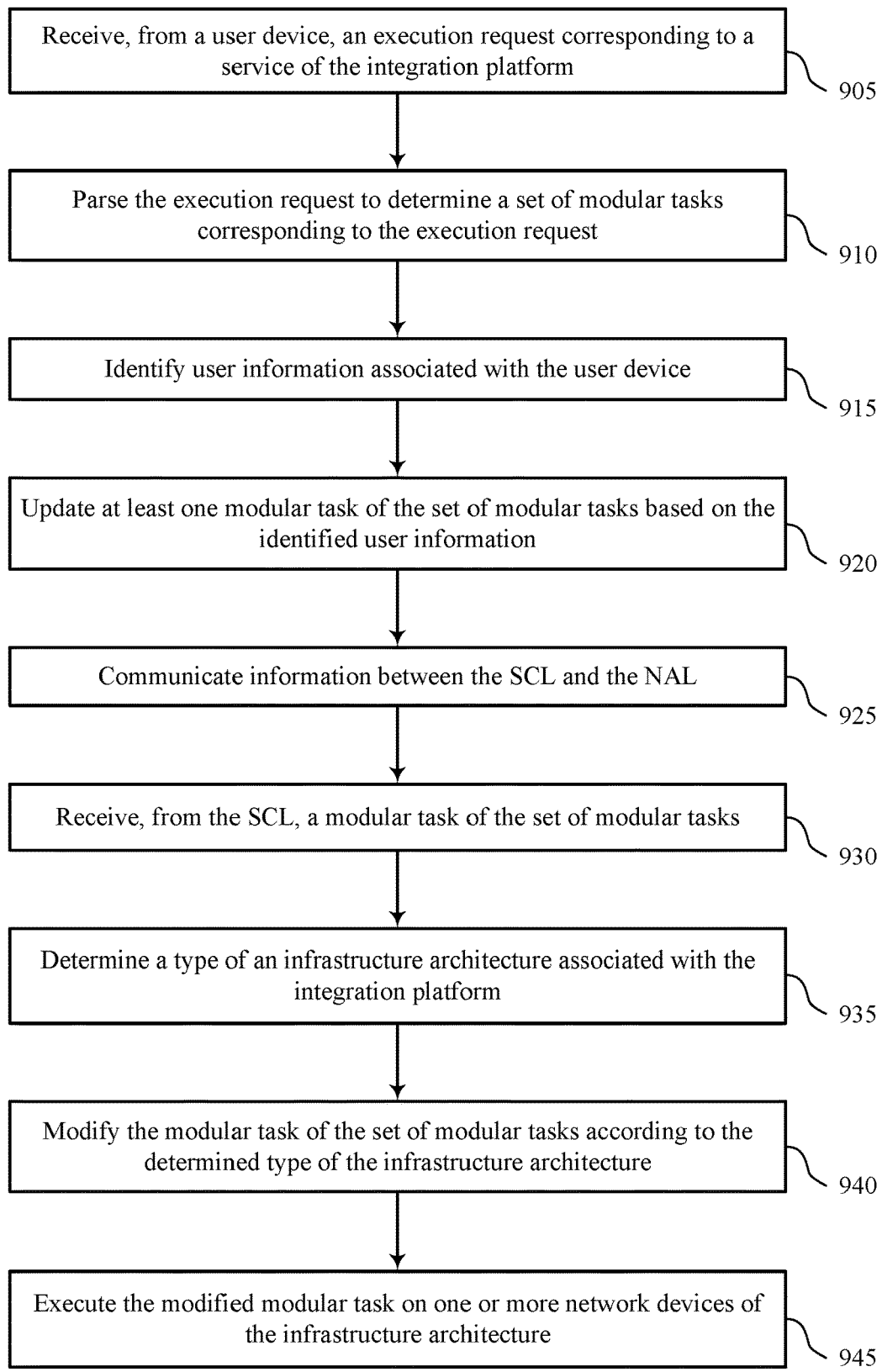
FIG. 9 shows a flowchart illustrating a method that supports integration of software applications with infrastructure in accordance with aspects of the present disclosure.

FIG. 9 shows a flowchart illustrating a method 900 that supports integration of software applications with infrastructure in accordance with aspects of the present disclosure. The operations of method 900 may be implemented by an integration platform or its components as described herein. For example, the operations of method 900 may be performed by an integration manager as described with reference to FIGS. 6 through 8. In some examples, an integration platform may execute a set of instructions to control the functional elements of the integration platform to perform the functions described below. Additionally or alternatively, an integration platform may perform aspects of the functions described below using special-purpose hardware. The integration platform may support integrating a set of software applications with a set of infrastructure architectures.

At 905, the integration platform may receive, from a user device, an execution request corresponding to a service of the integration platform. The operations of 905 may be performed according to the methods described herein. In some examples, aspects of the operations of 905 may be performed by an SCL and/or a request reception component as described with reference to FIGS. 6 through 8.

At 910, the integration platform may parse the execution request to determine a set of modular tasks corresponding to the execution request. The operations of 910 may be performed according to the methods described herein. In some examples, aspects of the operations of 910 may be performed by an SCL and/or a request parser as described with reference to FIGS. 6 through 8.

At 915, the integration platform may identify user information associated with the user device. The operations of 915 may be performed according to the methods described herein. In some examples, aspects of the operations of 915 may be performed by an SCL and/or a user information component as described with reference to FIGS. 6 through 8.

At 920, the integration platform may update at least one modular task of the set of modular tasks based on the identified user information. The operations of 920 may be performed according to the methods described herein. In some examples, aspects of the operations of 920 may be performed by an SCL and/or a user information component as described with reference to FIGS. 6 through 8.

At 925, the integration platform may communicate information between the SCL and an NAL. The operations of 925 may be performed according to the methods described herein. In some examples, aspects of the operations of 925 may be performed by an API and/or a communication component as described with reference to FIGS. 6 through 8.

At 930, the integration platform may receive, from the SCL, a modular task of the set of modular tasks. The operations of 930 may be performed according to the methods described herein. In some examples, aspects of the operations of 930 may be performed by an NAL and/or a modular task component as described with reference to FIGS. 6 through 8.

At 935, the integration platform may determine a type of an infrastructure architecture associated with the integration platform. The operations of 935 may be performed according to the methods described herein. In some examples, aspects of the operations of 935 may be performed by an NAL and/or an infrastructure identifier as described with reference to FIGS. 6 through 8.

At 940, the integration platform may modify the modular task of the set of modular tasks according to the determined type of the infrastructure architecture. The operations of 940 may be performed according to the methods described herein. In some examples, aspects of the operations of 940 may be performed by an NAL and/or an infrastructure identifier as described with reference to FIGS. 6 through 8.

At 945, the integration platform may execute the modified modular task on one or more network devices of the infrastructure architecture. The operations of 945 may be performed according to the methods described herein. In some examples, aspects of the operations of 945 may be performed by an NAL and/or a task execution component as described with reference to FIGS. 6 through 8.

An integration platform for integrating a set of software applications with a set of infrastructure architectures is described. The integration platform may include an SCL configured to receive, from a user device, an execution request corresponding to a service of the integration platform, parse the execution request to determine a set of modular tasks corresponding to the execution request, identify user information associated with the user device, and update at least one modular task of the set of modular tasks based on the identified user information. The integration platform may further include an API configured to communicate information between the SCL and an NAL. Additionally, the integration platform may include the NAL configured to receive, from the SCL, a modular task of the set of modular tasks, determine a type of an infrastructure architecture associated with the integration platform, modify the modular task of the set of modular tasks according to the determined type of the infrastructure architecture, and execute the modified modular task on one or more network devices of the infrastructure architecture.

A method for integrating a set of software applications with a set of infrastructure architectures is described. The method may include receiving, by an SCL and from a user device, an execution request corresponding to a service of an integration platform, parsing, by the SCL, the execution request to determine a set of modular tasks corresponding to the execution request, identifying, by the SCL, user information associated with the user device, and updating, by the SCL, at least one modular task of the set of modular tasks based on the identified user information. The method may further include communicating, by an API, information between the SCL and an NAL. Additionally, the method may include receiving, by the NAL and from the SCL, a modular task of the set of modular tasks, determining, by the NAL, a type of an infrastructure architecture associated with the integration platform, modifying, by the NAL, the modular task of the set of modular tasks according to the determined type of the infrastructure architecture, and executing, by the NAL, the modified modular task on one or more network devices of the infrastructure architecture.

An apparatus for integrating a set of software applications with a set of infrastructure architectures is described. The apparatus may include a processor, memory in electronic communication with the processor, and instructions stored in the memory. The instructions may be executable by the processor to cause the apparatus to configure an SCL to receive, from a user device, an execution request corresponding to a service of an integration platform, parse the execution request to determine a set of modular tasks corresponding to the execution request, identify user information associated with the user device, and update at least one modular task of the set of modular tasks based on the identified user information. The instructions may be further executable by the processor to cause the apparatus to configure an API to communicate information between the SCL and an NAL. Additionally, the instructions may be executable by the processor to cause the apparatus to configure the NAL to receive, from the SCL, a modular task of the set of modular tasks, determine a type of an infrastructure architecture associated with the integration platform, modify the modular task of the set of modular tasks according to the determined type of the infrastructure architecture, and execute the modified modular task on one or more network devices of the infrastructure architecture.

Another apparatus for integrating a set of software applications with a set of infrastructure architectures is described. The apparatus may include means for configuring an SCL to receive from a user device, an execution request corresponding to a service of an integration platform, parse the execution request to determine a set of modular tasks corresponding to the execution request, identify user information associated with the user device, and update at least one modular task of the set of modular tasks based on the identified user information. The apparatus may further include means for configuring an API to communicate information between the SCL and an NAL. Additionally, the apparatus may include means for configuring the NAL to receive, from the SCL, a modular task of the set of modular tasks, determine a type of an infrastructure architecture associated with the integration platform, modify the modular task of the set of modular tasks according to the determined type of the infrastructure architecture, and execute the modified modular task on one or more network devices of the infrastructure architecture.

A non-transitory computer-readable medium storing code for integrating a set of software applications with a set of infrastructure architectures is described. The code may include instructions executable by a processor to configure an SCL to receive, from a user device, an execution request corresponding to a service of an integration platform, parse the execution request to determine a set of modular tasks corresponding to the execution request, identify user information associated with the user device, and update at least one modular task of the set of modular tasks based on the identified user information. The code may further include instructions executable by the processor to configure an API to communicate information between the SCL and an NAL. Additionally, the code may include instructions executable by the processor to configure the NAL to receive, from the SCL, a modular task of the set of modular tasks, determine a type of an infrastructure architecture associated with the integration platform, modify the modular task of the set of modular tasks according to the determined type of the infrastructure architecture, and execute the modified modular task on one or more network devices of the infrastructure architecture.

Some examples of the integration platform, method, apparatuses, and non-transitory computer-readable medium described herein may further include an EXL. The EXL may include operations, features, means, or instructions for connecting the integration platform to the set of software applications running on a set of user devices. In some examples of the integration platform, method, apparatuses, and non-transitory computer-readable medium described herein, the EXL may include a service provisioning application, a network services application, a traffic engineering application, a workload management application, a service assurance application, or a combination thereof for managing connections with the set of software applications.

In some examples of the integration platform, method, apparatuses, and non-transitory computer-readable medium described herein, the infrastructure architecture may be an example of a first infrastructure architecture and the type of the infrastructure architecture may be an example of a first type of infrastructure architecture. In some examples of the integration platform, method, apparatuses, and non-transitory computer-readable medium described herein, the NAL may be further configured to identify a migration process from the first infrastructure architecture to a second infrastructure architecture of a second type of infrastructure architecture, receive, from the first infrastructure architecture, one or more configurations for the one or more network devices of the first infrastructure architecture, normalize the one or more configurations for the one or more network devices of the first infrastructure architecture, and configure one or more network devices of the second infrastructure architecture based on the normalization. In some examples of the integration platform, method, apparatuses, and non-transitory computer-readable medium described herein, the NAL may be further configured to determine the second type of infrastructure architecture based on the migration process, further modify the modular task of the set of modular tasks according to the determined second type of infrastructure architecture, and execute the further modified modular task on the one or more network devices of the second infrastructure architecture.

In some examples of the integration platform, method, apparatuses, and non-transitory computer-readable medium described herein, the NAL may be further configured to identify a new network device of the infrastructure architecture and configure the new network device of the infrastructure architecture based on the set of modular tasks.

Some examples of the integration platform, method, apparatuses, and non-transitory computer-readable medium described herein may further include an additional API. The additional API may include operations, features, means, or instructions for transmitting, to the user device, an indication of a user interface supporting construction of execution requests by a user, where the execution request may be received based on a user input to the user interface. In some examples of the integration platform, method, apparatuses, and non-transitory computer-readable medium described herein, the SCL may be further configured to receive an additional execution request based on an additional user input to the user interface, parse the additional execution request to determine an additional set of modular tasks corresponding to the additional execution request, and identify whether an execution sequence corresponding to the additional set of modular tasks is supported by the integration platform. In some examples of the integration platform, method, apparatuses, and non-transitory computer-readable medium described herein, the execution sequence corresponding to the additional set of modular tasks is not supported by the integration platform and the SCL may be further configured to transmit, to the user device, a sequencing error message based on the identifying whether the execution sequence corresponding to the additional set of modular tasks is supported by the integration platform.

In some examples of the integration platform, method, apparatuses, and non-transitory computer-readable medium described herein, the SCL may be further configured to receive a rollback command for a software application of the set of software applications, a network device of the one or more network devices of the infrastructure architecture, the execution request, or a combination thereof and release service resources corresponding to the software application of the set of software applications, the network device of the one or more network devices of the infrastructure architecture, the execution request, or the combination thereof based on the rollback command. In some examples of the integration platform, method, apparatuses, and non-transitory computer-readable medium described herein, the NAL may be further configured to release network resources corresponding to the software application of the set of software applications, the network device of the one or more network devices of the infrastructure architecture, the execution request, or the combination thereof based on the rollback command.

In some examples of the integration platform, method, apparatuses, and non-transitory computer-readable medium described herein, the NAL may be further configured to store, in a table in memory, indications of relationships between the one or more network devices of the infrastructure architecture and query the table in memory for one or more relationships of the relationships between the one or more network devices of the infrastructure architecture, where executing the modified modular task on the one or more network devices of the infrastructure architecture may be based on results of the querying.

In some examples of the integration platform, method, apparatuses, and non-transitory computer-readable medium described herein, the one or more network devices of the infrastructure architecture include a set of routers and the NAL may be further configured to establish an L2 VPN, an L3 VPN, or a combination thereof between the set of routers based on the executing.

In some examples of the integration platform, method, apparatuses, and non-transitory computer-readable medium described herein, the one or more network devices of the infrastructure architecture include a set of routers and the NAL may be further configured to establish a BGP routing protocol between the set of routers based on the executing. In some examples of the integration platform, method, apparatuses, and non-transitory computer-readable medium described herein, the BGP routing protocol is an example of an EBGP routing protocol, an IBGP routing protocol, or a combination thereof.

In some examples of the integration platform, method, apparatuses, and non-transitory computer-readable medium described herein, the NAL may be further configured to receive, from the SCL, a transaction including the set of modular tasks and an execution parameter and execute the set of modular tasks a number of times according to the execution parameter based on receiving the transaction.

In some examples of the integration platform, method, apparatuses, and non-transitory computer-readable medium described herein, the one or more network devices include servers, switches, access points, routers, modems, hubs, bridges, repeaters, racks, or a combination thereof. In some examples of the integration platform, method, apparatuses, and non-transitory computer-readable medium described herein, the set of modular tasks includes filtering tasks, validation tasks, configuration tasks, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An integration platform for integrating a plurality of software applications with a plurality of infrastructure architectures, comprising:
   one or more processors;
   memory in electronic communication with the one or more processors;
   instructions stored in the memory and executable by the one or more processors;
   a service composition layer (SCL) configured to:
      receive, from a user device, an execution request corresponding to a service of the integration platform;
      parse the execution request to determine a plurality of modular tasks corresponding to the execution request;
      identify user information associated with the user device; and
      update at least one modular task of the plurality of modular tasks based at least in part on the identified user information;
   an application programming interface (API) configured to:
      communicate information between the SCL and a network abstraction layer (NAL); and
   the NAL configured to:
      receive, from the SCL, a modular task of the plurality of modular tasks;
      determine a type of an infrastructure architecture associated with the integration platform;
      modify the modular task of the plurality of modular tasks according to the determined type of the infrastructure architecture; and
      execute the modified modular task on one or more network devices of the infrastructure architecture.

2. The integration platform of claim 1, further comprising:
   an experience layer (EXL) configured to:
      connect the integration platform to the plurality of software applications running on a plurality of user devices.

3. The integration platform of claim 2, wherein the EXL comprises a service provisioning application, a network services application, a traffic engineering application, a workload management application, a service assurance application, or a combination thereof for managing connections with the plurality of software applications.

4. The integration platform of claim 1, wherein the infrastructure architecture comprises a first infrastructure architecture and the type of the infrastructure architecture comprises a first type of infrastructure architecture, and wherein the NAL is further configured to:
   identify a migration process from the first infrastructure architecture to a second infrastructure architecture of a second type of infrastructure architecture;
   receive, from the first infrastructure architecture, one or more configurations for the one or more network devices of the first infrastructure architecture;
   normalize the one or more configurations for the one or more network devices of the first infrastructure architecture; and
   configure one or more network devices of the second infrastructure architecture based at least in part on the normalization.

5. The integration platform of claim 4, wherein the NAL is further configured to:

determine the second type of infrastructure architecture based at least in part on the migration process;

further modify the modular task of the plurality of modular tasks according to the determined second type of infrastructure architecture; and execute the further modified modular task on the one or more network devices of the second infrastructure architecture.

6. The integration platform of claim 1, wherein the NAL is further configured to:

identify a new network device of the infrastructure architecture; and configure the new network device of the infrastructure architecture based at least in part on the plurality of modular tasks.

7. The integration platform of claim 1, further comprising: an additional API configured to:

transmit, to the user device, an indication of a user interface supporting construction of execution requests by a user, wherein the execution request is received based at least in part on a user input to the user interface.

8. The integration platform of claim 7, wherein the SCL is further configured to:

receive an additional execution request based at least in part on an additional user input to the user interface;

parse the additional execution request to determine an additional plurality of modular tasks corresponding to the additional execution request; and identify whether an execution sequence corresponding to the additional plurality of modular tasks is supported by the integration platform.

9. The integration platform of claim 8, wherein the execution sequence corresponding to the additional plurality of modular tasks is not supported by the integration platform, the additional API further configured to:

transmit, to the user device, a sequencing error message based at least in part on the identifying whether the execution sequence corresponding to the additional plurality of modular tasks is supported by the integration platform.

10. The integration platform of claim 1, wherein:

the SCL is further configured to:

receive a rollback command for a software application of the plurality of software applications, a network device of the one or more network devices of the infrastructure architecture, the execution request, or a combination thereof; and release service resources corresponding to the software application of the plurality of software applications, the network device of the one or more network devices of the infrastructure architecture, the execution request, or the combination thereof based at least in part on the rollback command; and the NAL is further configured to:

release network resources corresponding to the software application of the plurality of software applications, the network device of the one or more network devices of the infrastructure architecture, the execution request, or the combination thereof based at least in part on the rollback command.

11. The integration platform of claim 1, wherein the NAL is further configured to:

store, in a table in memory, indications of relationships between the one or more network devices of the infrastructure architecture; and query the table in memory for one or more relationships of the relationships between the one or more network devices of the infrastructure architecture, wherein executing the modified modular task on the one or more network devices of the infrastructure architecture is based at least in part on results of the querying.

12. The integration platform of claim 1, wherein the one or more network devices of the infrastructure architecture comprise a plurality of routers and the NAL is further configured to:

establish a layer 2 (L2) virtual private network (VPN), a layer 3 (L3) VPN, or a combination thereof between the plurality of routers based at least in part on the executing.

13. The integration platform of claim 1, wherein the one or more network devices of the infrastructure architecture comprise a plurality of routers and the NAL is further configured to:

establish a border gateway protocol (BGP) routing protocol between the plurality of routers based at least in part on the executing.

14. The integration platform of claim 13, wherein the BGP routing protocol comprises an external BGP (EBGP) routing protocol, an internal BGP (IBGP) routing protocol, or a combination thereof.

15. The integration platform of claim 1, wherein the NAL is further configured to:

receive, from the SCL, a transaction comprising the plurality of modular tasks and an execution parameter; and execute the plurality of modular tasks a number of times according to the execution parameter based at least in part on receiving the transaction.

16. The integration platform of claim 1, wherein the one or more network devices comprise servers, switches, access points, routers, modems, hubs, bridges, repeaters, racks, or a combination thereof.

17. The integration platform of claim 1, wherein the plurality of modular tasks comprises filtering tasks, validation tasks, configuration tasks, or a combination thereof.

18. An apparatus for integrating a plurality of software applications with a plurality of infrastructure architectures, comprising:

a processor;

memory in electronic communication with the processor; and instructions stored in the memory and executable by the processor to cause the apparatus to:

configure a service composition layer (SCL) to:

receive, from a user device, an execution request corresponding to a service of an integration platform;

parse the execution request to determine a plurality of modular tasks corresponding to the execution request;

identify user information associated with the user device; and update at least one modular task of the plurality of modular tasks based at least in part on the identified user information;

configure an application programming interface (API) to:

communicate information between the SCL and a network abstraction layer (NAL); and configure the NAL to:

receive, from the SCL, a modular task of the plurality of modular tasks;

determine a type of an infrastructure architecture associated with the integration platform;

modify the modular task of the plurality of modular tasks according to the determined type of the infrastructure architecture; and execute the modified modular task on one or more network devices of the infrastructure architecture.

19. The apparatus of claim 18, wherein the instructions are further executable by the processor to cause the apparatus to:

configure an experience layer (EXL) to:

connect the integration platform to the plurality of software applications running on a plurality of user devices.

20. A method for integrating a plurality of software applications with a plurality of infrastructure architectures, the method comprising:

receiving, by a service composition layer (SCL) and from a user device, an execution request corresponding to a service of an integration platform;

parsing, by the SCL, the execution request to determine a plurality of modular tasks corresponding to the execution request;

identifying, by the SCL, user information associated with the user device;

updating, by the SCL, at least one modular task of the plurality of modular tasks based at least in part on the identified user information;

communicating, by an application programming interface (API), information between the SCL and a network abstraction layer (NAL);

receiving, by the NAL and from the SCL, a modular task of the plurality of modular tasks;

determining, by the NAL, a type of an infrastructure architecture associated with the integration platform;

modifying, by the NAL, the modular task of the plurality of modular tasks according to the determined type of the infrastructure architecture; and executing, by the NAL, the modified modular task on one or more network devices of the infrastructure architecture.

\* \* \* \* \*